(12) United States Patent
Willard et al.

(10) Patent No.: US 7,552,080 B1
(45) Date of Patent: Jun. 23, 2009

(54) CUSTOMIZED CREDIT OFFER STRATEGY BASED ON TERMS SPECIFIED BY AN APPLICANT

(75) Inventors: Paul Willard, Alameda, CA (US); Faye Anderson, San Mateo, CA (US); Jonathan Goldenstein, San Francisco, CA (US)

(73) Assignee: NextCard, LLC, Dallas, TX (US)

( * ) Notice: Subject to any disclaimer, the term of this patent is extended or adjusted under 35 U.S.C. 154(b) by 1250 days.

(21) Appl. No.: 09/802,481

(22) Filed: Mar. 9, 2001

(51) Int. Cl.
*G06Q 40/00* (2006.01)

(52) U.S. Cl. .......................... 705/37; 705/35

(58) Field of Classification Search .................. 705/26, 705/35–39
See application file for complete search history.

(56) References Cited

U.S. PATENT DOCUMENTS

| | | |
|---|---|---|
| 5,235,519 A | 8/1993 | Miura |
| 5,372,507 A | 12/1994 | Goleh |
| 5,375,055 A | 12/1994 | Togher et al. |
| 5,590,038 A | 12/1996 | Pitroda |
| 5,724,155 A | 3/1998 | Saito |
| 5,748,755 A | 5/1998 | Johnson et al. |
| 5,764,916 A | 6/1998 | Busey et al. |
| 5,778,164 A | 7/1998 | Watkins et al. |
| 5,819,235 A | 10/1998 | Tamai et al. |
| 5,857,079 A | 1/1999 | Claus et al. |
| 5,866,889 A | 2/1999 | Weiss et al. |
| 5,878,403 A * | 3/1999 | DeFrancesco et al. ......... 705/38 |
| 5,963,625 A | 10/1999 | Kawecki et al. |
| 5,970,478 A * | 10/1999 | Walker et al. .................. 705/35 |
| 5,991,740 A | 11/1999 | Messer ......................... 705/27 |
| 6,014,645 A * | 1/2000 | Cunningham ................ 705/38 |
| 6,044,360 A | 3/2000 | Picciallo |
| 6,049,784 A | 4/2000 | Weatherly et al. |
| 6,058,428 A | 5/2000 | Wang et al. |
| 6,064,987 A | 5/2000 | Walker et al. |
| 6,070,149 A | 5/2000 | Tavor et al. |
| 6,085,126 A | 7/2000 | Mellgren, III et al. |
| 6,085,195 A | 7/2000 | Hoyt et al. |
| 6,088,686 A * | 7/2000 | Walker et al. .................. 705/38 |
| 6,138,139 A | 10/2000 | Beck et al. |

(Continued)

FOREIGN PATENT DOCUMENTS

DK    EP 1850284 A1 *   4/2007

(Continued)

OTHER PUBLICATIONS

Anon, Regulation Z Commentary Amendments, Retail Banking Digest, vol. 15, No. 2, p. 17-18, Mar.-Apr. 1995.

(Continued)

*Primary Examiner*—Narayanswamy Subramanian
(74) *Attorney, Agent, or Firm*—Gardere Wynne Sewell LLP (57) ABSTRACT

A customized offer is transmitted to an applicant. A requested term is obtained from the applicant and a set of offers is determined for the applicant. An offer is selected from among the set of offers to display to the applicant using the requested term and the selected offer is transmitted to the applicant. Alternatively, a requested term is obtained from an applicant and the requested term is fixed. A set of offers is determined with the fixed requested term. An offer is selected from among the set of offers to display to the applicant and the selected offer is transmitted to the applicant.

11 Claims, 9 Drawing Sheets

U.S. PATENT DOCUMENTS

| | | | |
|---|---|---|---|
| 6,144,991 | A | 11/2000 | England |
| 6,167,395 | A | 12/2000 | Beck et al. |
| 6,185,543 | B1 | 2/2001 | Galperin et al. |
| 6,202,053 | B1 | 3/2001 | Christiansen et al. ......... 705/38 |
| 6,202,155 | B1 | 3/2001 | Tushie et al. |
| 6,240,396 | B1 * | 5/2001 | Walker et al. ................. 705/26 |
| 6,267,292 | B1 | 7/2001 | Walker et al. |
| 6,272,506 | B1 | 8/2001 | Bell |
| 6,289,319 | B1 | 9/2001 | Lockwood |
| 6,311,169 | B2 | 10/2001 | Duhon |
| 6,311,178 | B1 * | 10/2001 | Bi et al. ......................... 707/3 |
| 6,324,524 | B1 | 11/2001 | Lent et al. |
| 6,330,546 | B1 | 12/2001 | Gopinathan et al. |
| 6,349,290 | B1 | 2/2002 | Horowitz et al. |
| 6,356,909 | B1 * | 3/2002 | Spencer ...................... 707/10 |
| 6,374,230 | B1 * | 4/2002 | Walker et al. ................. 705/35 |
| 6,385,594 | B1 | 5/2002 | Lebda et al. .................. 705/38 |
| 6,405,181 | B2 | 6/2002 | Lent et al. ..................... 705/38 |
| 6,438,526 | B1 | 8/2002 | Dykes et al. .................. 705/38 |
| 6,449,646 | B1 | 9/2002 | Sikora et al. |
| 6,510,418 | B1 * | 1/2003 | Case et al. .................... 705/26 |
| 6,516,421 | B1 | 2/2003 | Peters et al. |
| 6,535,492 | B2 | 3/2003 | Shtivelman |
| 6,542,936 | B1 | 4/2003 | Mayle et al. |
| 6,567,791 | B2 | 5/2003 | Lent et al. |
| 6,622,131 | B1 | 9/2003 | Brown et al. |
| 6,718,313 | B1 | 4/2004 | Lent et al. |
| 6,766,302 | B2 | 7/2004 | Bach |
| 6,795,812 | B1 | 9/2004 | Lent et al. |
| 7,143,063 | B2 | 11/2006 | Lent et al. |
| 7,346,576 | B2 | 3/2008 | Lent et al. |
| 2001/0011245 | A1 | 8/2001 | Duhon |
| 2001/0011246 | A1 | 8/2001 | Tammaro |
| 2001/0011262 | A1 | 8/2001 | Hoyt et al. |
| 2001/0011282 | A1 | 8/2001 | Katsumata et al. |
| 2001/0014877 | A1 | 8/2001 | Defrancesco, Jr. et al. |
| 2001/0027436 | A1 | 10/2001 | Tenembaum |
| 2002/0016731 | A1 | 2/2002 | Kupersmit |
| 2002/0023051 | A1 | 2/2002 | Kunzle et al. |
| 2002/0029188 | A1 | 3/2002 | Schmid |
| 2002/0067500 | A1 | 6/2002 | Yokomizo et al. |
| 2003/0055778 | A1 | 3/2003 | Erlanger |
| 2003/0195848 | A1 | 10/2003 | Felger |
| 2004/0064412 | A1 | 4/2004 | Phillips et al. |
| 2005/0004864 | A1 | 1/2005 | Lent et al. |
| 2007/0027785 | A1 | 2/2007 | Lent et al. |
| 2008/0021816 | A1 | 1/2008 | Lent et al. |
| 2008/0270294 | A1 | 10/2008 | Lent et al. |
| 2008/0270295 | A1 | 10/2008 | Lent et al. |

FOREIGN PATENT DOCUMENTS

| | | | |
|---|---|---|---|
| EP | 1233361 A1 * | 12/2002 | |
| JP | 409288453 A * | 11/1997 | |
| JP | 2002328974 A * | 11/2002 | |
| WO | WO-9845797 | 10/1998 | |
| WO | WO-9909470 | 2/1999 | |
| WO | WO-9944152 | 9/1999 | |

OTHER PUBLICATIONS

Anon, San Diego Savings Association Offers Customers No-Fee Visa Product, Card News, Feb. 29, 1988.
Black, H.C., Black's Law Dictionary, pp. 1586-1589, West Publishing Co. St Paul, Min., 1990.
Bloom, J.K., "For This New Visa, Only Web Surfers Need Apply," American Banker, vol. 1163, No. 34, p. 12, Feb. 20, 1998.
Anon., "Lending Tree: Lending Tree Provides Borrowers Fast and Easy Online Access to Multiple Loan Offers," Business Wire, Jun. 23, 1998.
Harney, K.R., "Realty Brokers, Lenders Face Restrictions," Arizona Republic, Final Chaser edition, Sun Living section, p. S7, Feb. 10, 1991.
Higgins, K.T., "Mr. Plastic Joins the Marketing Team," Credit Card Management, vol. 6., No. 3, pp. 26-30, Jun. 1993.
"Creditnet.com—An Online Guide to Credit Cards", http://www.creditnet/com.
Kantrow, Yvette D., "Banks Press Cardholders to Take Cash Advances", American Banker, v. 157, n. 18, pp. 1-2. Jan. 28, 1992.
Black, H.C., Black's Law Dictionary, p. 1586-1589, West Publishing Co., St. Paul, Minnesota, 1990.
Emigh, J., "AnswerSoft Unveils Concerto for Web-Based Call Centers Feb. 5, 1996," Newsbytes, Feb. 5, 1997.
Grigonis, R., "Webphony—It's not Just Callback Buttons Anymore," Computer Telephony, p. 92, Dec. 1997.
Wagner, M., "Caring for Customers," Internet World, Sep. 1, 1999.
Sweat, J., "Human Touch—A New Wave of E-Service Offerings Blends the Web, E-Mail, and Voice Bringing People back into the Picture," Informationweek, Oct. 4, 1999.
Kirkpatrick, K., "Electronic Exchange 2000, The," Computer Shopper, Nov. 1999.
Anon., "InstantService.com Teams with Island Data to provide Integrated Solution for Online Customer Response," Business Wire, May 22, 2000.
Kersnar, S., "Countrywide Offers Proprietary Technology for Online Wholesale Lending," National Mortgage News, vol. 24, No. 38, p. 8, Jun. 5, 2000.
Microsoft Press Computer Dictionary, Third Edition, Microsoft Press, Redmond, 1997, pp. 88 and 265.
Whiteside, D.E., "One Million and Counting," Collections and Credit Risk, vol. 1, No. 11, p. 38, Nov. 1996.
Fickenscher, L., "Providian Undercuts rivals with 7.9% Rate Offer," American banker, vol. 163, p. 16, Oct. 8, 1998.
Fargo, J., "The Internet Specialists," Credit Card Management, vol. 11, No. 10, pp. 38-45, Jan. 1999.
Lemay, T., "Browsing for a Mortgage a Click away," Financial Post, p. 1, Jan. 15, 2000.
Wijnen, R., "Banks Fortify Online Services," Bank Technology News, vol. 13, No. 3, p. 8, Mar. 2000.
Armstrong, Douglas "Firstar Web Site Helps Add Up Future", Milwaukee Journal Sentinel, Mar. 28, 1996, Final Edition, front page through p. 8.
Anon. "IAFC Launches NextCard, The First True Internet VISA," Business Wire, New York: Feb. 6, 1998, p. 1 (3 pages).
Lazarony, Lucy, "Only Online Applicants Need Apply," Bank Advertising News, North Palm Beach, Mar. 23, 1998, vol. 21, Issue 15, p. 1 (3 pages).
FIData, Inc., News & Press Releases, "Instant Credit Union Loans via the Internet," http://web.archive.org/web/19990221115203/www.fidata-inc.com/news-pr01.htm.
FIData, Inc., Press Releases, "Instant Loan Approvals via the Internet," http://www.fidata-inc.com/news/pr_040198.htm, Apr. 1, 1998.
Staff, "On-Line System Approves Loans While Customer Waits"—Abstract, Communication News, vol. 31, Issue 9, Sep. 1994.
Hibbard, Justin; Dalton, Gregory; Thyfault, Mary E.; "Web-based Customer Care," InformationWeek, Jun. 1, 1998, 684, 18-20 (3 pages).
"ESL Federal Credit Union Inaugurates Internet Target Marketing," PR Newswire, 210, Oct. 6, 1998 (3 pages).
Nash, Kim S. "Calling all Customers," Computerworld, Dec. 1997, p. 25 and 28 (2 pages).
Anon. "Affordable Lending Systems Now Available for Smaller Financial Institutions," Business Wire, May 18, 1998 (2 pages).
Nexis—All News Sources—Examiner's NPL Search Results in U.S. Appl. No. 11/932,498, included with Office Action issued Oct. 8, 2008.
"Sample Experian Credit Report" by Consumer Information @222. consumerinfo.con/espsam.htm at we.archive.org/web/ Jul. 9, 1998.
Anon. "AnswerSoft Announces Concerto; First to Combine Call Center Automation with Power of Web," Business Wire, Feb. 3, 1997.

Plaintiff's Original Complaint, *Nextcard, LLC* v. *Liveperson, Inc.*; Civil Action No. 2:08-cv-00184-TJW, In the U.S. District Court for the Eastern District of Texas, Marshall Division, filed Apr. 30, 2008 (7 pages).

Amended Complaint and Jury Demand; *Liveperson, Inc.* v. *Nextcard, LLC, et al.*; Civil Action No. 08-062 (GMS), in the U.S. District Court for the District of Deleware, filed Mar. 18, 2008 (5 pages).

Plaintiff's Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 9, 2008 (12 pages).

Defendants HSBC North America Holdings Inc.'s and HSBC USA Inc's Answer, Affirmative Defenses and Counterclaims to Plaintiff's Second Amended Compalint; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).

Answer and Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).

Defendant The PNC Financial Services Group, Inc.'s Answer and Affirmative Defenses to Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 28, 2008 (10 pages).

Plaintiff's Second Amended Reply to Counterclaims of Defendants HSBC North America Holdings Inc. and HSBC USA Inc.; *Nextcard, LLC* v. *American Express Company, et al*; Civil Action No. 2:07-cv-354 (TJW); In the U.S. District Court for the Eastern District of Texas, Marshall Division, filed May 14, 2008 (5 pages).

Plaintiff's Second Amended Reply to Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed May 14, 2008 (7 pages).

Plaintiff's Second Amended Reply to Counterclaims of Defendant American Express Company; *Nextcard, LLC* v. *American Express Company, et al*; Civil Action No. 2:07-cv-354 (TJW); In the U.S. District Court for the Eastern District of Texas, Marshall Division, filed May 8, 2008 (8 pages).

Response to Restriction and Election Requirement mailed Aug. 21, 2008 in U.S. Appl. No. 10/901,715, filed Sep. 22, 2008 (10 pages).

Response to Office Action mailed Sep. 5, 2007, in U.S. Appl. No. 10/901,715, filed Feb. 5, 2008 (13 pages).

Reply Under 37 C.F.R. 1.111 mailed Jan. 19, 2007, in U.S. Appl. No. 09/991,894, filed Jul. 19, 2007 (4 pages).

Response to Final Office Action mailed Dec. 12, 2007, in U.S. Appl. No. 09/991,894, filed May 12, 2008 (10 pages).

Response to Non-Final Office Action mailed Jul. 21, 2008, in U.S. Appl. No. 09/991,894, filed Nov. 21, 2008 (14 pages).

U.S. Appl. No. 09/991,894, "On-Line Balance Transfers," filed Nov. 31, 2001 (43 pages).

Non-Final Office Action mailed Aug. 21, 2008, in U.S. Appl. No. 10/901,715 (8 pages).

Non-Final Office Action mailed Sep. 5, 2007, in U.S. Appl. No. 10/901,715 (15 pages).

Non-Final Office Action mailed Jan. 19, 2007, in U.S. Appl. No. 09/991,894 (8 pages).

Final Office Action mailed Dec. 12, 2007, in U.S. Appl. No. 09/991,894 (12 pages).

Non-Final Office Action mailed Jul. 21, 2008, in U.S. Appl. No. 09/991,894 (25 pages).

* cited by examiner

| | |
|---|---|
| WHAT WAS THE INTRODUCTORY INTEREST RATE (APR)? | CHOOSE ▼ |
| WHAT IS THE ONGOING INTEREST RATE (APR)? | CHOOSE ▼ |
| WHAT IS YOUR ANNUAL FEE? | CHOOSE ▼ |
| WHAT IS YOUR CREDIT LINE? | CHOOSE ▼ |
| DO YOU HAVE A REWARDS PROGRAM? | CHOOSE ▼ |
| DO YOU HAVE 24 HOUR INTERNET ACCESS TO YOUR ACCOUNT? | NO ▼ |
| ARE YOUR ONLINE PURCHASES PROTECTED AGAINST FRAUD? | NO ▼ |
| CAN YOU PAY YOUR BILL ONLINE? | NO ▼ |

| | YOUR CURRENT CARD | WHAT WOULD YOU LIKE TO CHANGE? | WHICH ONE IS MOST IMPORTANT? |
|---|---|---|---|
| INTRODUCTORY INTEREST RATE (APR) | XX% | CHOOSE ▼ | ○ |
| ONGOING INTEREST RATE (APR) | XX% | CHOOSE ▼ | ○ |
| ANNUAL FEE | XX% | CHOOSE ▼ | ○ |
| CREDIT LINE | XXXX | CHOOSE ▼ | ○ |
| REWARDS | | CHOOSE ▼ | ○ |
| INTERNET ACCESS | | YES ▼ | |
| ONLINE PURCHASES PROTECTED AGAINST FRAUD | | YES ▼ | |
| PAY YOUR CREDIT CARD BILL ONLINE | | YES ▼ | |

◀ GO BACK          CONTINUE ▶

| PLEASE INDICATE WHICH PRODUCT MOST CLOSELY MATCHES YOUR PREFERENCES: | CARD A ○ | CARD B ○ |
|---|---|---|
| INTRODUCTORY RATE | | |
| APR | | |
| ANNUAL FEE | $0 | $0 |
| CREDIT LINE | UP TO $20,000 | UP TO $20,000 |
| REWARDS PROGRAM | YES | YES |
| 24- HOUR INTERNET ACCESS | YES | YES |
| GUARANTEED SAFE ONLINE SHOPPING | YES | YES |

FIRST NAME   MI   LAST NAME   SUFFIX

STREET ADDRESS (NO P.O. BOX)   UNIT/APT #

CITY   STATE   **ZIP

LENGTH AT RESIDENCE   OWN/RENT STATUS
[0-6 MONTHS ▼]   [CHOOSE ONE ▼]

EMAIL ADDRESS

HOW WOULD YOU LIKE TO RECIEVE EMAIL FROM NEXTCARD?
EMAIL OPTIONS:  ○ TEXT ONLY  ⊙ GRAPHICAL EMAIL (HTML)

HOME PHONE
( [    ] ) [         ]

SOCIAL SECURITY NUMBER   DATE OF BIRTH
[            ]   [  ] / [  ] / [    ] MM/DD/YYYY

GROSS ANNUAL HOUSEHOLD INCOME***
$ [            ] PER YEAR

|                                                          | TELL US WHAT YOU WANT | MOST IMPORTANT |
|----------------------------------------------------------|----------------------|----------------|
| INTEREST RATE                                            | ☐ %                  |  |
| ANNUAL FEE (PAYING AN ANNUAL FEE MAY LOWER YOUR INTEREST RATE) | $ ☐              |  |
| CREDIT LIMIT                                             | $ ☐                  |  |
| REWARDS PROGRAM                                          |                      |  |
| PLATINUM CARD                                            |                      |  |

FIG. 6A

|                    |        | MOST IMPORTANT |
|--------------------|--------|:--------------:|
| INTEREST RATE      | XX%    | ⦿              |
| ANNUAL FEE         | $XX    | ○              |
| CREDIT LIMIT       | $XXX   | ○              |
| REWARDS PROGRAM    |        | ○              |
| PLATINUM CARD      |        | ○              |

CUSTOMIZED CREDIT OFFER STRATEGY BASED ON TERMS SPECIFIED BY AN APPLICANT

CROSS REFERENCE TO RELATED APPLICATIONS

This application is related to co-pending U.S. patent application Ser. No. 09/185,201 entitled "Method And Apparatus For Real Time On Line Credit Approval" filed Nov. 3, 1998, which is incorporated herein by reference for all purposes; and co-pending U.S. patent application Ser. No. 09/185,878 entitled "Method And Apparatus For A Verifiable On Line Rejection Of An Applicant For Credit" filed Nov. 3, 1998, which is incorporated herein by reference for all purposes; and co-pending U.S. patent application Ser. No. 09/185,000 entitled "Method And Apparatus For An Account Level Offer Of Credit And Real Time Balance Transfer" filed Nov. 3, 1998, which is incorporated herein by reference for all purposes.

FIELD OF THE INVENTION

The present invention relates generally to an online application for a credit card. More specifically, determining an offer based on user preferences is disclosed.

BACKGROUND OF THE INVENTION

On line credit card application and approval has greatly simplified the process of obtaining a credit card for an applicant. As described in U.S. patent application "Method And Apparatus For Real Time On Line Credit Approval" which was previously incorporated by reference, U.S. patent application entitled "Method And Apparatus For A Verifiable On Line Rejection Of An Applicant For Credit" which was previously incorporated by reference, and U.S. patent application entitled "Method And Apparatus For An Account Level Offer Of Credit And Real Time Balance Transfer" which was previously incorporated by reference, multiple offers may be presented to an applicant and the applicant given the opportunity to select among the offers. The flexibility of this process is beneficial. It would be useful if the ability of the applicant to select a custom offer could be further enhanced so that such an offer provided to the applicant could have an even greater chance of acceptance.

SUMMARY OF THE INVENTION

Accordingly, presenting an applicant with the opportunity to specify certain desired credit card terms is disclosed. In addition, the applicant may specify what term or terms are most important to the applicant. Alternatively, the applicant may specify the terms of a current credit card and indicate what terms the applicant would like to change, and, possibly, how those terms should be changed. The specified preferences are used by an offer generating server to select or generate an appropriate offer that will satisfy the applicant specified preferences to the extent possible.

In one embodiment, a customized offer is transmitted to an applicant. A requested term is obtained from the applicant and a set of offers is determined for the applicant. An offer is selected from among the set of offers to display to the applicant using the requested term and the selected offer is transmitted to the applicant.

In one embodiment, a customized offer is transmitted to an applicant. A requested term is obtained from an applicant and the requested term is fixed. A set of offers is determined with the fixed requested term. An offer is selected from among the set of offers to display to the applicant and the selected offer is transmitted to the applicant.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

In one embodiment, an applicant is given the choice to either specify preferences without reference to a current credit card or to specify the terms of a credit card that the applicant already has and indicate changes that the applicant would like to be made. Once the terms are specified by the applicant, an offer server uses the terms to select an appropriate offer that matches to the extent possible the terms specified by the applicant.

Figure 1:
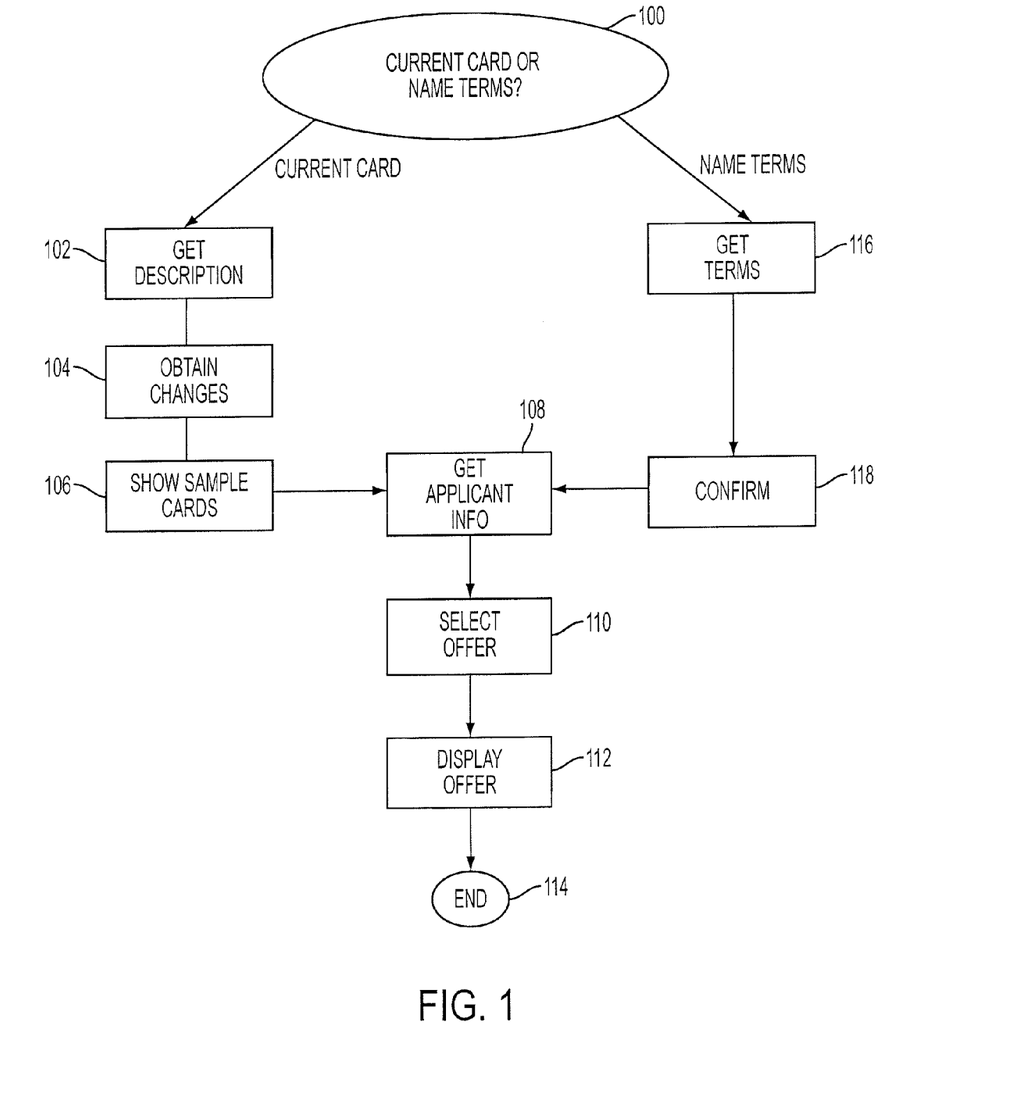
FIG. 1 is a flow chart illustrating a process for obtaining a set of requested terms or preferences from an applicant.

FIG. 1 is a flow chart illustrating a process for obtaining a set of requested terms or preferences from an applicant. The process starts at 100 when the user is prompted to select whether the user wants to enter the terms of a current card for comparison or to simply name his own terms. If the applicant selects the option for entering terms of a current card, then control is transferred to a step 102. In step 102, the description of the current card is obtained from the applicant. Step 102 is described in further detail in connection with FIG. 2.

Next, in a step 104, the changes that the applicant would like to make to the current card are obtained from the applicant. Step 104 is described in further detail in FIG. 3. In a step 106, the applicant is shown a plurality of sample cards that may satisfy the applicant's preferences. The applicant may be given an opportunity to specify which of the cards is preferable. Based on the applicant's selection of one of the choices, the offer may be further tailored to the applicant's preferences. For example, one card may include a higher introductory rate than the other while the long term rate of the card with the higher introductory rate is lower. Also, an annual fee may be specified for one card and not the other. From the applicant's selection of one of the cards, the importance attached by the applicant to the terms in the selected card that are better than the corresponding terms in the non selected cards is derived. This information may be used along with or instead of priorities expressed by the applicant in prior steps. This step is described in further detail in FIG. 4.

In a step 108, applicant information is obtained so that a credit report can be acquired for the applicant and a decision about an appropriate offer of credit may be made. Step 108 is described in further detail in FIG. 5. Then, in a step 110, the offer is selected as described in further detail in FIGS. 7A and 7B. Finally, in step 112, the offer is displayed to the applicant and the process ends at 114.

Figure 7A:
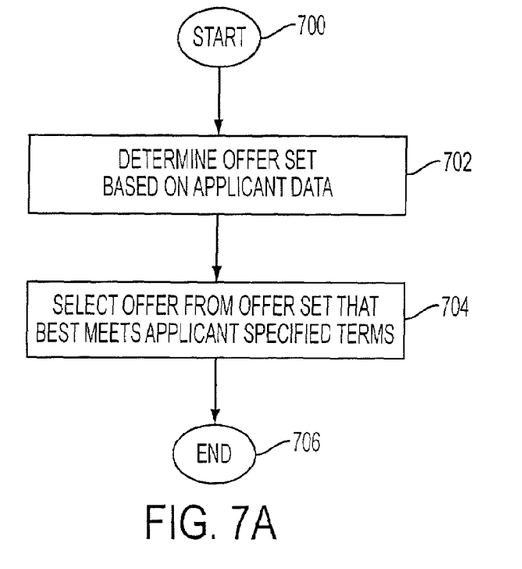
FIG. 7A is a flow chart illustrating a process for using applicant specified terms to obtain offers to present to the applicant.
Figure 7B:
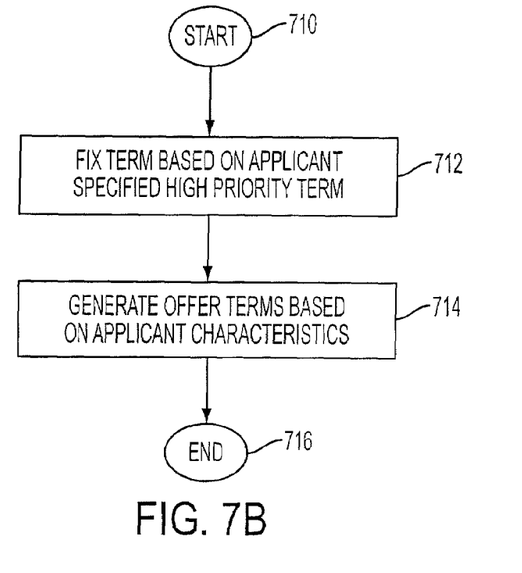
FIG. 7B is a flow chart illustrating a process for using applicant specified terms in determining an offer set.

As shown in FIG. 7A, the applicant's specified terms may be used to select from among a set of offers determined using the applicant data. Alternatively, as shown in FIG. 7B, the applicant high priority term may be fixed to the value specified by the applicant and the offer generator may attempt to generate an offer that conforms with the rest of the applicant data and requirements of the system that relate risk to required return for credit card accounts.

If instead of specifying the terms of a current card, the applicant selects to name his own terms, then control is transferred to a step 116 and the applicant's requested terms are obtained. Step 116 is described further in connection with FIG. 6A. Once the terms are obtained, then control is transferred to a step 118 and the applicant confirms the specified terms. Step 118 is described further in connection with FIG. 6B. Once the terms are confirmed, then control is transferred to step 108 and the process continues as described above.

The above description shows how user specified preferences for credit terms may be obtained using three methods. First, the user may specify a current card and specify changes that the user would like to make to that card. Second, the user may specify terms for a credit card. Third, alternative credit cards may be displayed to the user with different terms and the user may select among the cards. In different embodiments, these methods of obtaining user preferences for terms may be used individually or in any combination. In addition to simply obtaining terms, some indication of which terms are most important is obtained from the user.

In the embodiment shown below, the user is given the opportunity to specify which term from among a set of terms is the highest priority term for the user. In other embodiments, the user may rank terms. In embodiments that present two different cards for the user to compare, the priority that the user assigns to certain terms is derived based on the terms of the card that is preferred by the applicant. For example, if a card with a better long term rate but a higher introductory rate is selected, then it is determined that the long term rate is the more important term to the user.

In general, credit card terms are determined based on an assessment of the cost of the risk being taken by the card issuer to provide each term as well as the expected revenue from the card. The risk and the expected revenue are driven by the characteristics of the applicant that are obtained directly from the applicant and also from credit reports obtained for the applicant. For example, the behavior of the applicant (for example, whether the applicant tends to maintain a revolving balance or tends to be a transactor that pays off his balance every month) affects the expected revenue that will be generated by the applicant. The applicant's credit rating and general tendency to pay off debts in a timely manner affects the risk that the applicant will default on the credit line. For a higher credit line, the expected loss as a result of default increases.

These factors as well as others are considered by the offer generating server to determine appropriate offers for the applicant. A large number of appropriate offers may be determined that vary different offer parameters. For example, any number of variations where a higher annual fee supplements the expected income from the card may be determined that allow different credit limits and/or interest rates to be offered to the applicant. In addition, a higher credit limit or lower interest rate may be provided to the applicant if the applicant transfers a balance which tends to increase the likely revenue expected from the card. Many other factors may influence the terms that may be offered to a given applicant.

Certain terms are requested by the applicant or indicated by the applicant to be important using the processes described above. As a result of the terms specified by the applicant, offers that conform to those terms to the extent possible are selected from the many offers that could be generated for a given applicant.

Figure 2:
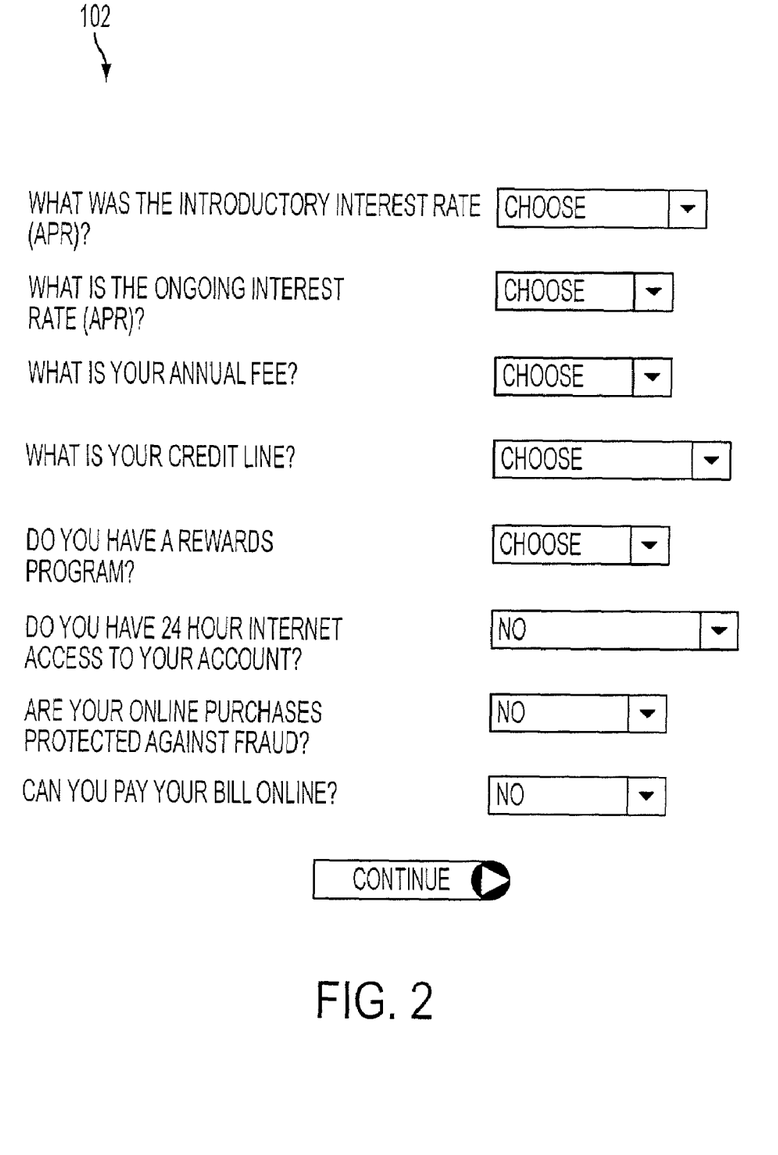
FIG. 2 is a sample web page used in one embodiment to obtain information about a current credit card used by an applicant.

FIG. 2 is a sample web page used in one embodiment to obtain information about a current credit card used by the applicant. The applicant is given the opportunity to specify a number of terms such as the introductory interest rate, the ongoing (long term) interest rate, the annual fee, the credit limit, and the existence of a rewards program.

Figure 3:
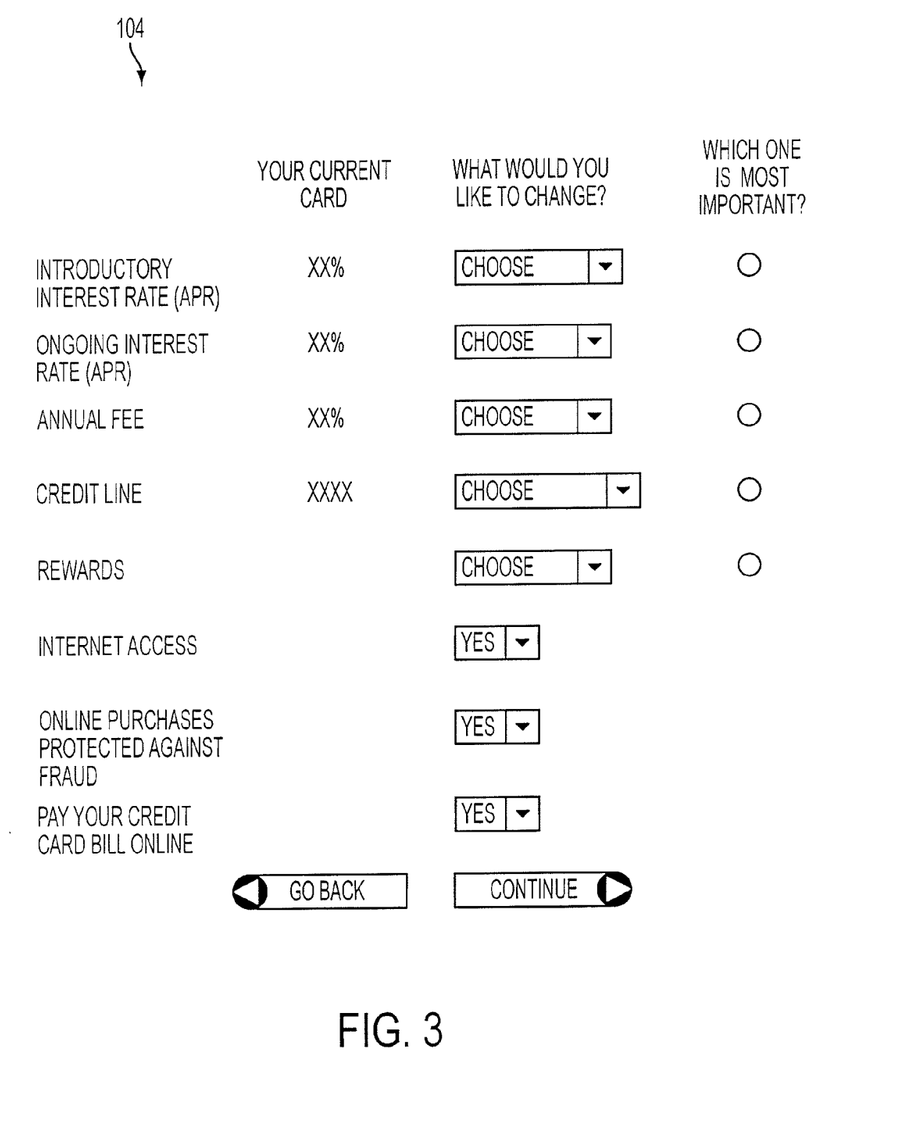
FIG. 3 is an illustration of a web page used to display the terms entered by an applicant for a current card and provide the applicant an opportunity to specify how the applicant would like the terms to be changed and what changes are most important to the applicant.

FIG. 3 is an illustration of a web page used to display the terms entered by the applicant for a current card and provide the applicant an opportunity to specify how the applicant would like the terms to be changed and what changes are most important to the applicant. For example, the ongoing interest rate of the current card that was entered by the applicant is displayed and an opportunity to choose from one or more improved interest rates is provided to the applicant in the form of a pick list. In addition, the applicant can select a button for one of the terms indicating that it is the most important term to the applicant. In this manner, the applicant is led through a process of evaluating the terms of his current credit card and determining how those terms should be changed. An alternative process where the applicant simply describes terms that would be desirable is illustrated in FIG. 6A.

Figure 4:
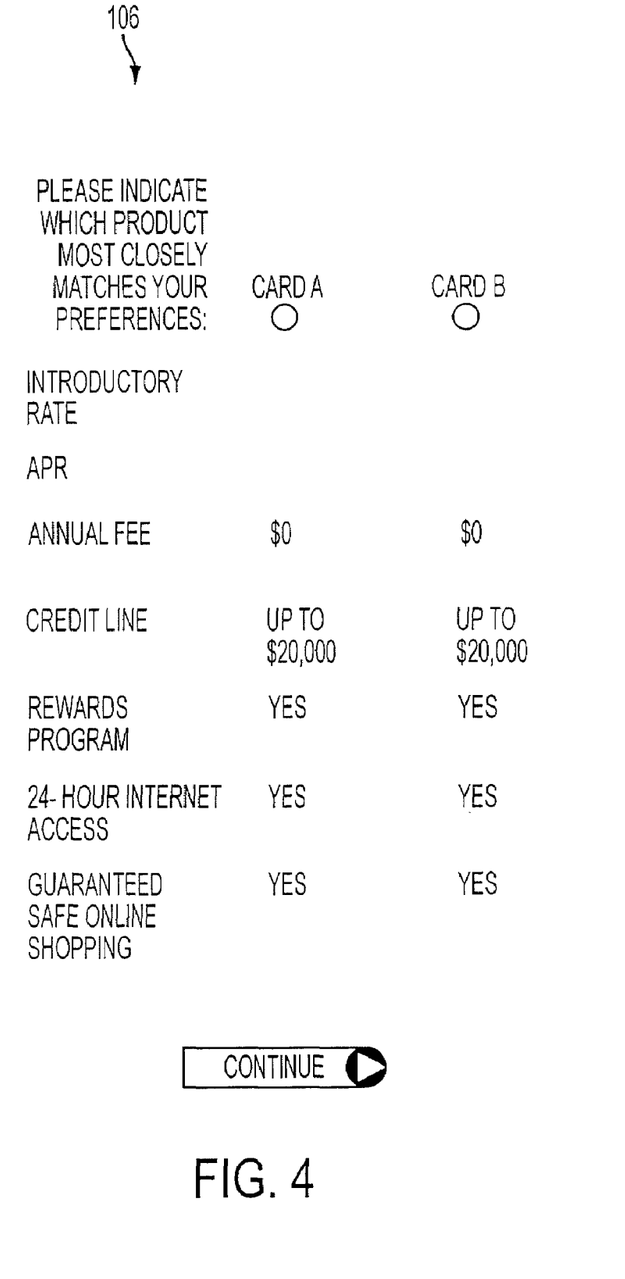
FIG. 4 is an illustration of a web page that displays the terms of two cards to an applicant and allows the applicant to indicate which card is preferable.

FIG. 4 is an illustration of a web page that displays the terms of two cards to the applicant and allows the applicant to indicate which card is preferable. The display includes the terms described above and the applicant is presented with buttons that enable the applicant to select one of the cards. As described above, the selection of one of the cards is used to determine what terms are most important to the applicant.

Figure 5:
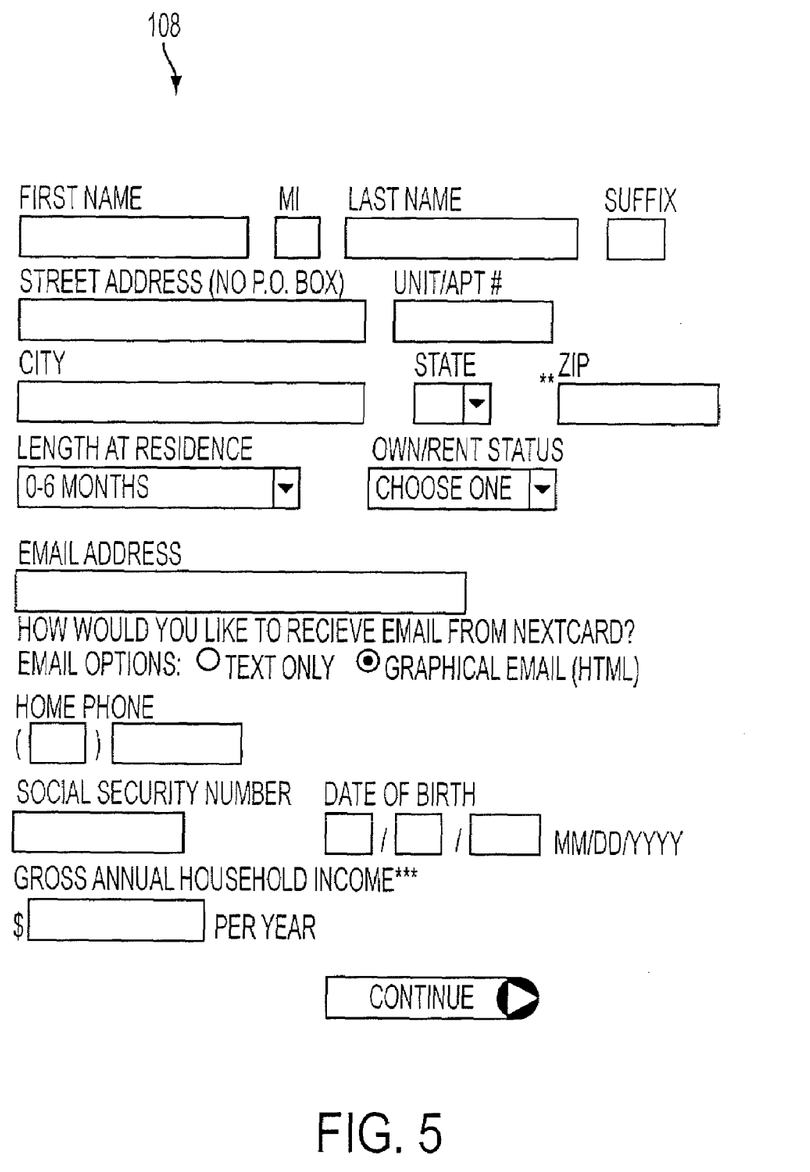
FIG. 5 is a diagram illustrating an input screen used to obtain information about an applicant.

FIG. 5 is a diagram illustrating an input screen used to obtain information about the applicant. In some embodiments, the information is obtained before the applicant begins to specify desired credit terms. The applicant provides information about himself from which a credit report can be obtained. Both the applicant information and the credit report information are used to assess the cost of the risk of offering the applicant certain credit terms as well as the expected revenue from the applicant that would result from certain offered terms.

Figure 6A:
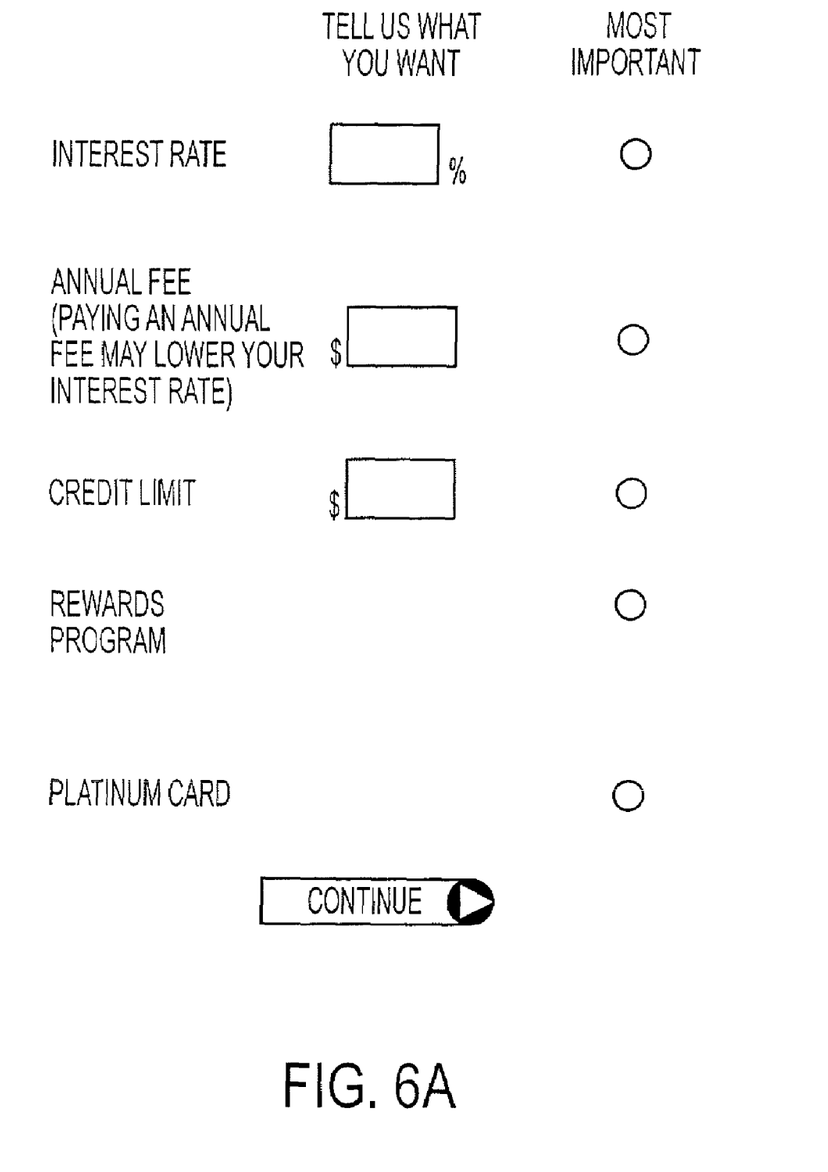
FIG. 6A is an illustration of a web page used to obtain desired terms from an applicant.

FIG. 6A is an illustration of a web page used to obtain desired terms from an applicant. The illustrated terms include interest rate, annual fee, and credit limit as well as the existence of a reward program and the type of card. Other terms such as those described above may also be provided to the applicant such as an introductory interest rate. The applicant specifies the terms requested and indicates which of the terms is most important.

Figure 6B:
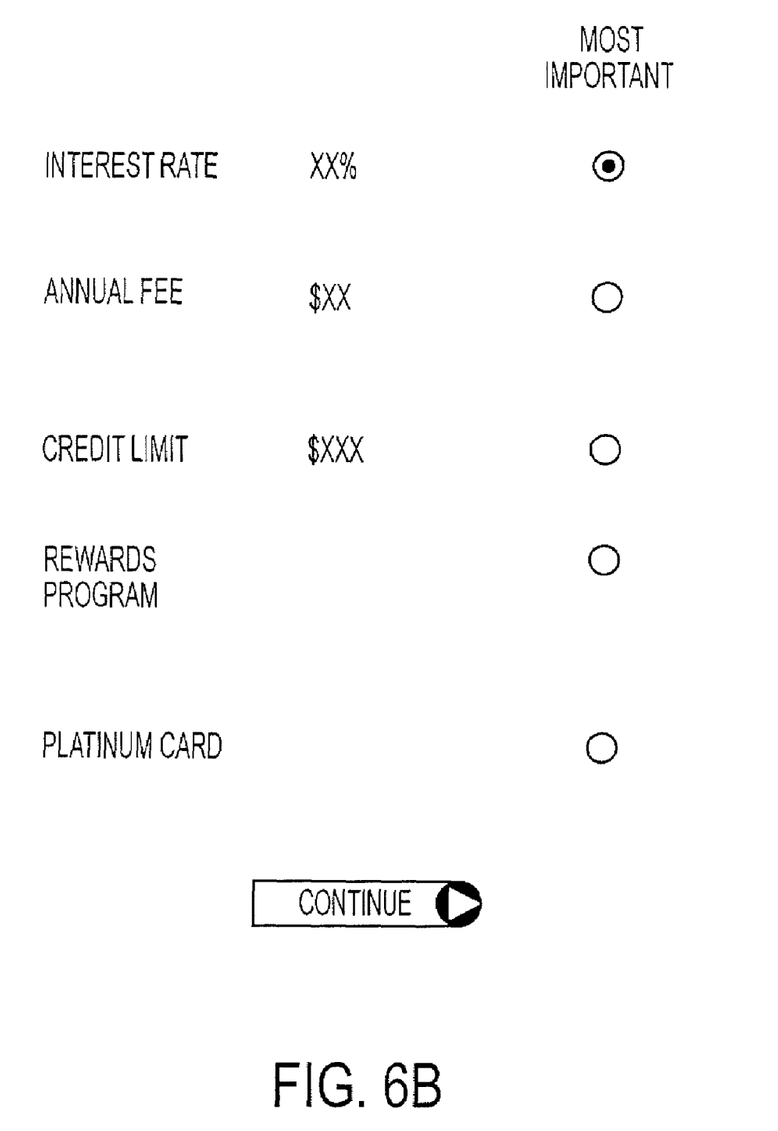
FIG. 6B is an illustration of a web page used to confirm an applicant's specification of terms and the selection of the most important term.

FIG. 6B is an illustration of a web page used to confirm the applicant's specification of terms and the selection of the most important term.

Thus, the applicant either specifies terms of a current card and indicates how the applicant would like to have those terms to be changed or specifies desired terms without relating them to a current card. In addition, the applicant specifies what term is the most important term to the applicant. In one embodiment, these terms are used to select an offer from among all the possible offers that may be extended to the applicant based on the applicant's assessed risk and expected revenue.

FIG. 7A is a flowchart illustrating a process for using the applicant specified terms to obtain offers to present to the applicant. The process starts at 700. In a step 702, an offer set is determined based on the applicant data. In a step 704, an offer is selected from the offer set that best meets the applicant specified terms. The process ends at 706. Thus, the offer server uses the applicant data entered by the applicant and obtained from the credit report to determine a set of offers. The offer set includes offers that vary different terms to balance the risk taken by the credit card issuer with the expected revenue from the applicant. The selection of offers to be displayed to the applicant is made from the offer set using the applicant specified term as a criteria. For example, if the applicant specifies a low introductory rate as the most important term, then offers with the best low introductory rate or nearly the best possible low introductory rate are selected.

In some embodiments, a hierarchy of terms is established to select the right offer. For example, a subset of offers may first be determined that have the best or near the best values for the terms selected by the applicant as being most important. A further selection of offers to be displayed to the applicant is made by considering the other terms specified by the applicant and choosing the offers in the subset of offers that best conform to the other terms specified by the applicant. In embodiments where terms are ranked by the applicant, then a hierarchical selection of subsets of offers from the original offer set are made according to the ranked priority of the terms specified by the applicant.

In another embodiment, the applicant specified terms are used to drive the determination of an offer set. The process starts at 710. In a step 712, the highest priority term specified by the applicant is fixed and offers are determined that conform to that term and varying other terms so that the risk and expected return are acceptable to the card issuer in a step 714. The process then ends at 716. Thus, the most important terms specified by the applicant may be used to constrain the generation of offers. It may be that no offers can be generated for a term exactly as specified by the applicant. In such a case, the term may be adjusted. In some embodiments, multiple terms specified by the applicant may be used to help generate an offer. In such cases, fuzzy logic may be used to cause the most important terms to the applicant to be best matched by the offer. Terms may be weighted by the applicant and an offer that conforms as much as possible to the weighted terms is generated.

It should be noted that the scheme of generating offers based on assessed applicant risk and expected return and then selecting from among those offers using applicant specified preferred terms is particularly useful. The applicant specified terms do not complicate the generation of a large set of offers, but are used to select from among those offers a limited set of offers displayed to the applicant for acceptance. By using the applicant's expressed preferences to determine the offers to be displayed, the likelihood of the applicant receiving an offer that will be accepted is greatly enhanced. Because the offer generator can generate a large, diverse group of offers, some guidance from the applicant for selecting among those offers is of great help.

Figure 8A:
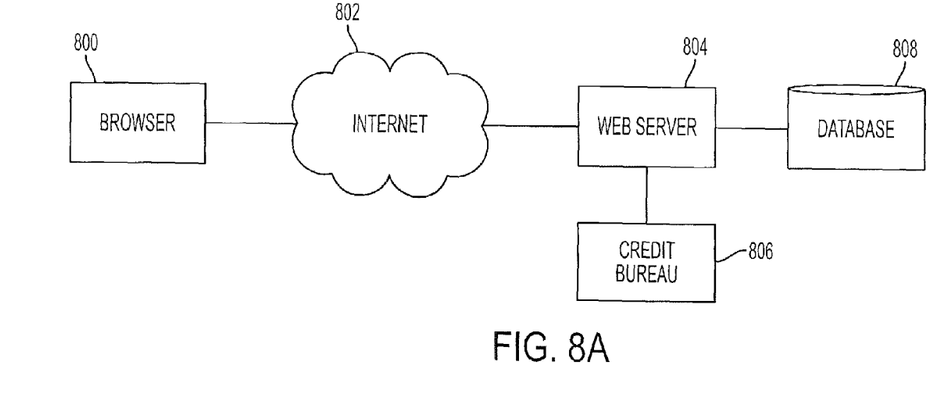
FIG. 8A is a block diagram illustrating interaction of an applicant with a server that determines an offer for the applicant.

FIG. 8A is a block diagram illustrating how an applicant may interact with a server that determines an offer for the applicant. The applicant uses a browser 800 connected via the Internet 802 to a web server 804. Web server 804 connects to a credit bureau 806 and a database 808. In different embodiments, web server 804 is divided among a set of servers performing different functions, for example, one web server may handle sending and receiving web pages and another server may handle the actual underwriting and evaluation of the applicant using data from database 808. In general, the browser may be implemented on a PC or other commonly available computing platform and the server may be implemented on a PC, UNIX workstation or other appropriate computing platform.

Figure 8B:
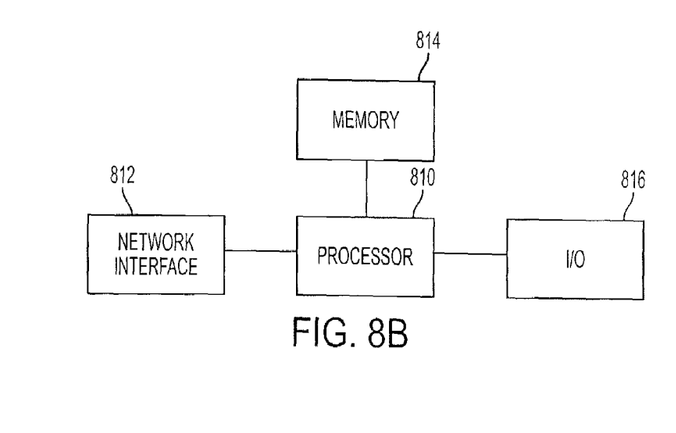
FIG. 8B is a block diagram illustrating the structure of a typical server or machine for implementing a web browser.

FIG. 8B is a block diagram illustrating the structure of a typical server or machine used to implement a web browser. A processor 810 is connected to a network interface 812 and a memory 814. In addition an IO interface 816 is provided so that a user may interact with the computer.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer implemented method of transmitting a customized offer to an applicant comprising:

receiving over a network a plurality of terms requested by the applicant, wherein at least one of the requested terms is indicated by the applicant as preferred over at least another one of the requested terms;

determining with one or more computers a set of offers for the applicant;

if the set of offers includes at least one offer that meets all of the requested terms, selecting with the one or more computer from among the set of offers at least one offer that meets all of the requested terms;

if the set of offers does not include at least one offer that meets all of the requested terms but includes at least one offer that meets at least one of the preferred requested terms, selecting with the one or more computers from among the set of offers at least one offer that meets the at least one of the preferred requested terms;

otherwise, not selecting an offer from the set of offers; and transmitting any selected offer from the set of offers to the applicant.

2. A method of transmitting a customized offer to an applicant as recited in claim 1 wherein a plurality of offers are selected from the set of offers and transmitted to the applicant.

3. A method of transmitting a customized offer to an applicant as recited in claim 1 wherein if it is not possible for any offer in the set of offers to meet at least one of the preferred requested terms, at least one of the requested terms is adjusted.

4. A method of transmitting a customized offer to an applicant as recited in claim 1 wherein one of the terms is identified by the applicant as the most important term.

5. A method of transmitting a customized offer to an applicant as recited in claim 4 wherein selecting the at least one offer includes selecting offers that have preferred values for the most important term.

6. A method of transmitting a customized offer to an applicant as recited in claim 1 wherein the requested terms are ranked by the applicant.

7. A method of transmitting a customized offer to an applicant as recited in claim 1 wherein receiving the plurality of terms requested by the applicant includes obtaining terms for a current card from the applicant and receiving desired changes to those terms.

8. A method of transmitting a customized offer to an applicant as recited in claim 1 wherein receiving the plurality of terms requested by the applicant includes displaying a plurality of cards having different terms to the applicant and determining which of the cards is requested.

9. A method of transmitting a customized offer to an applicant as recited in claim 1 wherein selecting the at least one offer includes selecting offers that have preferred values for the requested term.

10. A system for preparing a customized offer for an applicant comprising:
    an interface configured to:
    receive a plurality of terms requested by the applicant, wherein at least one of the requested terms is indicated by the applicant as preferred over at least another one of the requested terms; and
    transmit at least one offer to the applicant; and
    a processor coupled with the interface and with a memory for storing program instructions, the processor configured by the program instructions to:
    determine a set of offers for the applicant;
    if the set of offers includes at least one offer that meets all of the requested terms, select from among the set of offers the at least one offer that meets all of the requested terms; and
    otherwise, select from among the set of offers the at least one offer that meets the at least one of the preferred requested terms.

11. A computer program product for preparing a customized offer to an applicant, the computer program product being embodied in a computer readable medium and comprising computer instructions for:
    receiving a plurality of terms requested by the applicant, wherein at least one of the requested terms is indicated by the applicant as preferred over at least another one of the requested terms;
    determining a set of offers for the applicant;
    if the set of offers includes at least one offer that meets all of the requested terms, selecting from among the set of offers at least one offer that meets all of the requested terms;
    otherwise, selecting from among the set of offers at least one offer that meets the at least one of the preferred requested terms; and
    transmitting the at least one offer to the applicant if an offer is selected; otherwise, not transmitting the at least one offer to an applicant.

\* \* \* \* \*